United States Patent [19]
Chiu

[11] 3,766,983
[45] Oct. 23, 1973

[54] STABILIZED NONIONIC POLYSACCHARIDE THICKENED WATER

[75] Inventor: Ying-Chech Chiu, Houston, Tex.

[73] Assignee: Shell Oil Company, Houston, Tex.

[22] Filed: May 15, 1972

[21] Appl. No.: 253,420

[52] U.S. Cl.................. 166/274, 166/270, 166/275, 166/305 R
[51] Int. Cl............................................. E21b 43/16
[58] Field of Search................ 166/244 D, 270, 274, 166/275, 300, 304

[56] References Cited
UNITED STATES PATENTS

| | | | |
|---|---|---|---|
| 3,371,710 | 3/1968 | Harvey et al. | 166/274 |
| 3,508,612 | 4/1970 | Reisberg et al. | 166/275 |
| 3,532,166 | 10/1970 | Williams | 166/275 |
| 3,581,824 | 6/1971 | Hurd | 166/270 |
| 3,648,770 | 3/1972 | Dreher et al. | 166/275 |

OTHER PUBLICATIONS

Allene Jeanes, "Composition and Properties of a Heteropolysaccharide Produced from Glucose by Xanthomonas Campestris", Abstract of Papers, 136th Meeting American Chemical Society, Sept. 13–18, 1959, page 7D.

*Primary Examiner*—Marvin A. Champion
*Assistant Examiner*—Jack E. Ebel
*Attorney*—H. W. Coryell et al.

[57] ABSTRACT

A reservoir oil displacing fluid that is relatively stable toward multivalent metal ions comprises an aqueous liquid solution of a viscosity enhancing amount of a water soluble nonionic polysaccharide and an effective amount of a water soluble metal salt adapted to clarify a calcium ion induced turbidity in that solution.

4 Claims, No Drawings

STABILIZED NONIONIC POLYSACCHARIDE THICKENED WATER

BACKGROUND OF THE INVENTION

This invention relates to a well treating process or oil recovery process in which a relatively viscous aqueous liquid is injected into a subterranean reservoir to displace oil within the reservoir. More particularly, the invention relates to a nonionic polysaccharide (or biopolymer) thickened water which is stabilized against the viscosity altering effects of the multivalent metal ion-containing waters that are apt to be encountered in such reservoirs.

Prior well treating processes or oil recovery processes have used various natural or synthetic ionic polymers as water thickeners or viscosity enhancing agents. The natural ionic polymers are typified by the polysaccharide B-1459, produced by fermenting a sugar with a bacteria of the *Xanthomonas campestris* NRRL B-1459. Such an ionic polysaccharide contains dextroglucose, detromannose and dextroglucuronic acid groups along with a significant proportion of acetic acid (in the form of acetyl groups) and pyruvic acid (attached through ketal linkages).

Although the previously used natural ionic polysaccharide water thickeners are advantageous relative to synthetic ionic polymer water thickeners (in having a relatively high thickening efficiency, being relatively stable under reservoir conditions, and being producible at lower cost) they tend to agglomerate and form reservoir plugging materials when they are mixed with aqueous liquids containing multivalent ions (such as the alkaline earth metal ions that are commonly present in waters encountered in subterranean reservoirs). For example, in U.S. Pat. No. 3,581,824, the agglomerating tendency of an ionic polysaccharide, such as the polysaccharide B-1459, is utilized to selectively plug the most permeable zones in a reservoir being water flooded. The plugging is effected by preceding an injection of an aqueous solution of such a polysaccharide by an injection of an aqueous liquid having a relatively high concentration of divalent ion.

SUMMARY OF THE INVENTION

This invention relates to a reservoir oil displacing fluid that is relatively stable toward multivalent metal ions and a use of such a fluid to displace oil within a subterranean reservoir. The present oil displacing fluid comprises an aqueous liquid solution containing a viscosity enhancing amount of a water soluble nonionic polysaccharide and an effective amount of a water soluble metal salt that is capable of clarifying a calcium ion induced turbidity in that solution (i.e. the specified aqueous solution of the specified poly-saccharide).

The oil displacing process of this invention comprises the steps of: (1) injecting an aqueous liquid of low calcium ion content, preferably one containing less than about 360 parts per million calcium ion, into a portion of the reservoir through which oil is to be displaced, with said injection being continued to the extent required to reduce the calcium ion concentration of the aqueous liquid in that portion of the reservoir to less than one which could impart a significantly high calcium ion concentration, e.g. one greater than about 1,000 parts per million, to slug of water which is displaced through that portion of the reservoir, (2) injecting into the same portion of the reservoir an aqueous solution that contains a viscosity enhancing amount of a water soluble nonionic polysaccharide, has a relatively low calcium ion concentration, preferably one of less than about 360 parts per million, and contains an effective amount of a water soluble metal salt capable of clarifying a calcium ion induced turbidity in an aqueous solution of that polysaccharide, and (3) displacing the viscosity enhanced aqueous solution through the reservoir to displace the oil.

In certain situations, some or all of the above fluid injecting steps can be accomplished by injecting a single fluid. For example, where the calcium ion concentration of the reservoir water is not excessive and/or the distance by which the oil is to be displaced is too short to cause a significant increase in the calcium ion content of an aqueous liquid being displaced through the reservoir for that distance, no fluid need be injected in order to effect the step 1 adjustment of the reservoir water calcium ion concentration. The calcium ion concentration of the portion of the reservoir through which the oil is to be displaced is preferably kept below about 1,000 parts per million. Where the distance by which the reservoir oil is to be displaced is relatively short (for example, in a well treatment operation for removing a water injectivity-impeding concentration of residual oil from around an injection well) the step 3 displacement of the viscosity enhanced aqueous solution can be effected by simply injecting more of that solution. Thus, in certain situations, all 3 stpes can be effected by simply injecting the specified viscosity enhanced aqueous solution until the oil has been displaced.

Nonionic polysaccharides suitable for use in this invention comprise those characterized by a multiplicity of D-glucose units attached together in a straight chain through beta-1,3 linkages. Such polysaccharides are produced when the appropriate molds are incubated in a medium containing carbohydrate source materials. Suitable polysaccharides and method for their production are described in U. S. Pat. No. 3,301,848. Suitable nonionic polysaccharides are commercially available under the trade name Polytran from the Pillsbury Company. A particularly suitable material comprises Polytran-FS in the form of a water solution containing about 0.3 to 0.4 percent by weight of the polysaccharide.

The nonionic polysaccharides are chemically distinct from the ionic polysaccharides (particularly because of the absence of any anionic carboxyl groups). In general, the nonionic polysaccharide solutions tend to be strongly pseudoplastic and have viscosities which are relatively free of fatigue or hysterisis when subjected to varying degrees of shear. They also have viscosities which are relatively pH and salt insensitive and undergo no apparent viscosity decrease with temperature up to about 400°F.

In general, in displacing an oil within a subterranean reservoir formation by injecting a viscosity enhanced aqueous solution, the effective viscosity (or reciprocal of the mobility within the reservoir) should be at least substantially equal to and perferably greater than that of the reservoir oil and/or any oil displacing liquid (such as an aqueous or oil external sur-factant system) that is injected ahead of the viscosity enhanced solution. In the present process, the concentration of the nonionic polysaccharide should be in the order of from about 100 to 1,000 parts by weight of polysaccharide per million parts by weight of solution. Such a concentration provides viscosities in the order of from about 2 to 50 centipoises at room temperature in water containing about 4,000 ppm total solid. Such viscosities are usually sufficient to provide effective displacements of a reservoir oil.

Although an aqueous solution of a nonionic polysaccharide is generally salt insensitive, it tends to become turbid when mixed with more than about 20 parts per million of calcium ion. Such a turbidity can be removed by filtration, for example, through a 5 micron millipore filter. However, such a filtration requires additional time and expense and causes the viscosity of the aqueous solution to be descreased, particularly when the salt concentration of the solution is relatively high.

The nonionic polysaccharides are uniquely affected by calcium ions. Although ionic polysaccharide solutions (e.g., Kelzan-M; a form of polysaccharide B-1459 that is commercially available from the Kelco Company) are generally more reactive with multivalent metal ions, the turbidity of a nonionic polysaccharide solution (e.g. Polytran-FS) is greater in a synthesized reservoir formation water. The synthesized formation water is an aqueous solution containing the following metal ions in about the following concentration (in parts per million): sodium, 2,000 parts; chloride, 4,600 parts; calcium, 360 parts; magnesium, 180 parts; and barium 90 parts. In that water, the turbidity of the nonionic polysaccharide solution is about 3 to 5 times that of the ionic polysaccharide solution.

The present invention is at least in part based on a discovery that an aqueous solution of a viscosity enhancing amount of a nonionic polysaccharide can be stabilized against the formation of calcium induced turbidity by incorporating in the solution an effective amount of a water soluble metal salt that is capable of clarifying such a calcium induced turbidity. It was found that (1) the turbidity clarifying or preventing phenomena is indicative of an involvement of both the charge on the metal ions and the specific chemical properties of those ions, (2) the existence of a significant amount of such a capability in a given metal is indicated by its capability of clarifying or reducing a calcium induced turbidity in a water solution of the polysaccharide at least in response to a relatively short time heating at a relatively mild temperature, and (3) the existence of an outstanding amount of such a capability in a given metal is indicated by such a turbidity clarification within a few minutes at room temperature.

The data in Table 1 shows the effects of various properties of any various metal ions on a solution of about 900 parts per million Polytran-FS in water (at which concentration the solution viscosity is about equal to that provided by 1500 parts per million Kelzan M in water ). The metal ions were added by dropwise additions of water solutions containing about 1000 parts per million of the indicated metal salts. The results of such tests are indicative of the relative immunity of aqueous solutions of nonionic polysaccharides to relatively large amounts of multivalent metal ions other than calcium ions. Note that no gellation occured — not even after aging over night — in any of the indicated multivalent metal containing solutions of this nonionic polysaccharide.

Table 1
EFFECT OF ADDING SALT ON POLYTRAN-FS SOLUTION

| Total Amount of Salt ppm | Viscosity,* cp (6 rpm, room temp.) | pH | Turbidity (Visual Observation) | Gel Formation (after aging overnight) |
|---|---|---|---|---|
| 0 | 69.5 | 4.1 | 0 | no |
| 250 ZnCl$_2$ | 41.3 | 2.4 | 0 | " |
| 250 MgCl$_2$ | 42.6 | 2.5 | 0 | " |
| 50 CaCl$_2$ | 43.2 | 2.9 | turbid | " |
| 250 FeSO$_4$ | 44.0 | 2.2 | 0 | " |
| 250 BaCl$_2$ | 47.6 | 4.2 | 0 | " |
| 12,000 NaCl | — | — | 0 | " |

* After the addition of salt solution, the total volume increased by 25 percent.

The data in Table 2 shows the calcium induced turbidity reducing effects of adding various metals to a solution of about 900 parts per million Polytran-FS and about 100 parts per million calcium chloride in water. Note that the test results indicate three categories of effectiveness: (1) metals, such as the trivalent metals, which remove the turbidity in a few minutes at room temperature, (2) metals which remove the turbidity after a brief heating at 70°C, and (3) metals which provide some turbidity reduction but do not produce any additional effect on prolonged heating at 70°C.

Table 2
EFFECT OF ADDING ELECTROLYTE ON CLARIFYING POLYTRAN-FS SOLUTION

| Total Amount of Titrant ppm | Turbidity (at room temp.) | Turbidity (after heating at 70°C for certain time) | Gel Formation (after aging overnight |
|---|---|---|---|
| 0 | 60 | 60 (100 min) | no |
| 50 FeCl$_3$ | 0 | — | " |
| 50 Al(NO$_3$)$_3$ | 0 | — | " |
| 180 FeSO$_4$ | 0 | — | " |
| 250 ZnCl$_2$ | 6 | 0 (2 min) | " |
| 250 MgCl$_2$ | 14 | 0 (2 min) | " |
| 250 Cr(NO$_3$)$_3$.9H$_2$O | 26 | 0 (5 min) | " |
| 14,000 NaCl | 26 | 28 (100 min) | " |
| 250 BaCl$_2$ | 35 | 33 (100 min) | " |

The data in Table 3 shows the effects of adding trivalent cations to a Polytran-FS solution containing about 900 parts per million of the polysaccharide and the following amounts (in parts per million) of the following metal ions: 1000 parts sodium; 2300 parts chloride; 180 parts calcium; 90 parts magnesium; and 45 parts barium. The tested solutions which were clarified by solutions of 17 parts per million ferric ion (50 parts per million ferric chloride) and 10 parts per million aluminum (80 parts per million aluminum nitrate) were further tested by additions of several hundred parts per million of calcium chloride. The so-tested solutions remained clear.

Table 3
EFFECT OF ADDING TRIVALENT CATIONS ON POLYTRAN-FS SOLUTION

| Total Amount | Viscosity (6 rpm, | Gel Formation (after |

| of Titrant | room temp.) | pH | Turbidity | aging over-night) |
|---|---|---|---|---|
| 0 | 54.0 | 4.3 | 28 | no |
| 50 ppm FeCl$_3$ | 51.2 | 3.1 | 0 | " |
| 80 ppm Cr(NO$_3$)$_3$ . 9H$_2$O | 49.3 | 3.6 | turbid | " |
| 80 ppm Cr(NO$_3$)$_3$ . 9H$_2$O (after heating at 70°C) | 48.2 | 3.5 | 0 | " |
| 80 ppm Al(NO$_3$)$_3$ | 49.0 | 2.8 | 0 | " |

In order to determine whether the clarifying effect could be obtained by a change in pH, a turbid solution of polysaccharide in multivalent metal-containing water (the type used in Table 3) was titrated with a one molar solution of hydrochloric acid. The titration gradually lowered the pH of the solution from an initial value of 4.3 to a final value of 2.3, involving an addition of 1700 parts per million of hydrochloric acid. Throughout the titration, the turbidity of the solution remained unchanged. Heating of the titrated turbid solution at 70° and also at 100° for a relatively long time did not clear up the turbidity. It is thus apparent that the relatively specific effect of calcium ion on inducing turbidity in a nonionic polysaccharide solution is not significantly effected by the pH of the solution.

In general, the oil displacing liquids of the present invention can advantageously be used in oil displacing operations and/or oil recovery operations in conjunction with substantially any of the conventionally used water-flooding additives and/or supplemental materials, such as: surface active systems or components; sacrificially absorbed solutes, such as carbonates, polyphosphates, or the like; pH adjusting materials, etc. The liquids of the present invention are particularly useful in a chemical flood oil recovery process in which a slug of surfactant system is injected ahead of (or its surfactant components are dissolved in) a portion of the present oil displacing liquid. As used herein, the term "oil displacing liquid" or "the displacing of oil" within a reservoir refers to such an operation where the oil being displaced is contacted by either the oil displacing liquid or a surfactant that contains or precedes such a liquid.

The calcium ion content of the present oil displacing liquid is preferably kept below about 360 parts per million while the total dissolved salt concentration is preferably kept below about 7,000 parts per million. The water used in formulating the present oil displacing liquid can be substantially any natural or synthetic water or aqueous solution that has such a salt concentration, at it occurs in nature or as a result of a water treatment.

In the present process for displacing oil within a subterranean reservoir a determination is preferably made of the salt concentration of the water that is present in the portion of the reservoir through which the oil is to be displaced. Such a determination can be made by sampling and analyzing a portion of the reservoir fluid, or can be based on information obtained from prior operations and/or equivalent operations in the same or other reservoirs. Where the combination of the concentration of calcium ions in the water in that portion of the reservoir and the amount of distance by which the oil is to be displaced within the reservoir (and thus the distance by which the frontal portion of the slug of the present oil displacing liquid is to be displaced through the reservoir) is such that the displacement will significantly increase the calcium ion concentration of the present oil-displacing liquid, the injection of the present oil displacing liquid should be preceded by an injection of an aqueous solution having a relatively low calcium ion concentration, in order to prevent such a calcium ion buildup. Such an aqueous solution can be substantially any aqueous solution of substantially inert salts. It is preferably an aqueous solution containing less than about 7,000 parts per million total dissolved salt.

What is claimed is:

1. In a process for displacing oil within a subterranean reservoir by injecting a viscosity enhanced aqueous liquid into the reservoir, the improvement comprising:

injecting aqueous liquid having a relatively low concentration of parts per million calcium ions into the reservoir to the extent required to reduce the calcium ion concentration of the aqueous liquid in the reservoir portion through which the oil is to be displaced to not more than about 1,000 parts per million;

injecting an aqueous solution of a viscosity enhancing amount of a water soluble nonionic polysaccharide that has a relatively low calcium ion concentration and contains an effective amount of a water soluble metal salt that is capable of clarifying a calcium ion induced turbidity in an aqueous solution of the polysaccharide; and displacing said polysaccharide-containing aqueous solution through the portion of the reservoir to which the oil is to be displaced.

2. The process of claim 1 in which said turbidity clarifying salt is a salt of a trivalent metal.

3. The process of claim 2 in which said salt is an iron salt.

4. The process of claim 2 in which said salt is an aluminum.

* * * * *